(12) United States Patent
Morse et al.

(10) Patent No.: US 9,205,701 B2
(45) Date of Patent: Dec. 8, 2015

(54) WHEEL COVER

(75) Inventors: Kevin E. Morse, Lake Orion, MI (US);
Michael P. Williams, II, Bloomfield Hills, MI (US); Robert J. Zander, Troy, MI (US)

(73) Assignee: Cadillac Products Automotive Company, Troy, MI (US)

( * ) Notice: Subject to any disclaimer, the term of this patent is extended or adjusted under 35 U.S.C. 154(b) by 835 days.

(21) Appl. No.: 13/404,135

(22) Filed: Feb. 24, 2012

(65) Prior Publication Data

US 2013/0049440 A1 Feb. 28, 2013

Related U.S. Application Data

(60) Provisional application No. 61/529,480, filed on Aug. 31, 2011.

(51) Int. Cl.
*B60B 7/00* (2006.01)
*B60B 7/06* (2006.01)
*B60B 7/08* (2006.01)

(52) U.S. Cl.
CPC ................ *B60B 7/0026* (2013.01); *B60B 7/066* (2013.01); *B60B 7/08* (2013.01); *B60B 2360/32* (2013.01); *B60B 2900/325* (2013.01)

(58) Field of Classification Search
CPC .......... B60B 7/0066; B60B 7/02; B60B 7/06; B60B 7/061; B60B 7/063; B60B 7/066; B60B 7/08; B60B 7/00; B05B 15/0487
USPC .......... 301/37.11, 37.22, 37.23, 37.39, 37.42, 301/37.43, 37.101, 37.102, 37.103
See application file for complete search history.

(56) References Cited

U.S. PATENT DOCUMENTS 2,159,881 A * 5/1939 Booth ........................ 301/37.38
2,618,513 A * 11/1952 Horn ........................ 301/64.302

(Continued)

FOREIGN PATENT DOCUMENTS

JP 2006-256360 9/2006

OTHER PUBLICATIONS

International Search Report for PCT/US2012/026556 mailed Feb. 27, 2013.

(Continued)

*Primary Examiner* — S. Joseph Morano
*Assistant Examiner* — Jean Charleston
(74) *Attorney, Agent, or Firm* — Harness, Dickey & Pierce, P.L.C.

(57) ABSTRACT

A removable wheel cover includes a dome-shaped body having a perimeter edge and a central core. A body elevation increases from the perimeter edge to a maximum elevation between the perimeter edge and the central core. Concentric raised ribs between the perimeter edge and the maximum elevation decrease in diameter between successive raised ribs toward the maximum elevation. A central core sleeve wall has an end face. An apex of each of multiple sleeve wall tabs positioned proximate the end face together define a first plane positioned with respect to a perimeter edge second plane. A wheel having a central hub is mounted to a tire. In an installed position, the perimeter edge is positioned in continuous contact with the tire or the wheel and the body is elastically deflected toward the wheel to engage the tabs against a wheel hub aperture raised edge thereby resisting wheel cover removal.

37 Claims, 10 Drawing Sheets

(56) References Cited

U.S. PATENT DOCUMENTS

| | | | |
|---|---|---|---|
| 3,092,420 A * | 6/1963 | Baldwin et al. | 301/37.38 |
| 3,101,975 A * | 8/1963 | Peoples | 301/37.42 |
| 3,876,257 A * | 4/1975 | Buerger | 301/37.42 |
| 3,883,181 A * | 5/1975 | Dissinger | 301/37.42 |
| 4,889,394 A * | 12/1989 | Ruspa | 301/37.36 |
| 5,112,112 A | 5/1992 | Baba | |
| 5,393,128 A * | 2/1995 | Sarmast et al. | 301/37.34 |
| 5,524,972 A | 6/1996 | Cailor et al. | |
| 5,853,228 A * | 12/1998 | Patti et al. | 301/37.371 |
| 6,305,755 B1 * | 10/2001 | Oblizajek et al. | 301/37.31 |
| 6,428,112 B1 * | 8/2002 | Passoth et al. | 301/37.42 |
| 6,485,106 B1 * | 11/2002 | Hermansen et al. | 301/37.103 |
| 6,783,189 B1 * | 8/2004 | Russell et al. | 301/37.12 |
| 2002/0125763 A1 | 9/2002 | Stembridge | |
| 2007/0085412 A1 * | 4/2007 | Saulnier | 301/37.103 |
| 2008/0001467 A1 | 1/2008 | Gilly et al. | |

OTHER PUBLICATIONS

Written Opinion of the International Searching Authority for PCT/US2012/026556 mailed Feb. 27, 2013.

* cited by examiner

WHEEL COVER

CROSS-REFERENCE TO RELATED APPLICATIONS

This application claims the benefit of U.S. Provisional Application No. 61/529,480, filed on Aug. 31, 2011. The entire disclosure of the above application is incorporated herein by reference.

FIELD

The present disclosure relates to protective covers temporarily applied to automotive vehicle wheels following assembly and during shipment and storage prior to sale.

BACKGROUND

This section provides background information related to the present disclosure which is not necessarily prior art.

Polymeric wheel covers have been used to temporarily cover the aluminum or steel wheels of automotive vehicle wheels after assembly of the vehicle is complete and during shipment to a dealership for sale. The wheel covers are intended to stay in contact with the wheel or tire to prevent ambient conditions such as rain, dust, saltwater, and/or pollutants from contacting and oxidizing a finish of the wheel, or oxidizing the surface of proximate items such as brake rotors or drums. The wheel covers are intended to be removable and reusable, but need to remain in place and intact during the entire period of their use. Known designs include flat peel-and-stick covers having an adhesive on one surface which temporarily retains a surface of the wheel cover to the wheel.

Known problems with existing wheel covers used for this purpose include marring of the rim/tire by contact from the wheel cover, adhesive residue which must be cleaned from the wheel or tire surfaces, the inability of the wheel cover to provide and maintain 360 degree contact with the tire, and the inability of the wheel cover to remain in place during transit, particularly during shipment on a car or vehicle carrier. High velocity air entering behind known wheel covers moves the outer edge of the wheel cover away from contact with the wheel or tire, allowing further air to deflect the wheel cover. Known wheel covers can permanently deflect by bending substantially in half, or are completely displaced by this high velocity air flow. If the wheel cover deflects sufficiently to yield wheel cover material, even if the wheel cover is not permanently displaced, the wheel cover cannot be re-used, thereby increasing the cost by requiring a new wheel cover to replace each damaged wheel cover.

SUMMARY

This section provides a general summary of the disclosure, and is not a comprehensive disclosure of its full scope or all of its features.

According to several aspects, a removable wheel cover for temporary use in covering automotive vehicle wheels includes a polymeric material body having a perimeter edge. Multiple concentric raised ribs created in the body define multiple body peaks and valleys. A reverse outer rib is positioned proximate to the perimeter edge and outward of the raised ribs. The reverse outer rib has one of the valleys and a raised lip making contact with the tire or wheel ending proximate to the perimeter edge.

According to other aspects, a removable wheel cover for temporary use in protecting automotive vehicle wheels includes a dome-shaped polymeric material body having a perimeter edge and a central core. The body increases in elevation from the perimeter edge to a maximum elevation located between the perimeter edge and the central core. The central core is positioned below the maximum elevation. Multiple concentric raised ribs are created in the body between the perimeter edge and the maximum elevation, the raised ribs decreasing in diameter between successive ones of the raised ribs toward the maximum elevation. A sleeve wall of the central core has an end face defining a first plane selectively positioned with respect to a second plane defined at the perimeter edge.

According to further aspects, a removable wheel cover for temporary use in protecting automotive vehicle wheels includes a dome-shaped polymeric material body having a circular perimeter edge, the body increasing in elevation from the perimeter edge to a peak elevation; and a central core recessed with respect to the peak elevation. Multiple concentric raised ribs are created in the body between the perimeter edge and the peak elevation, each decreasing in diameter between successive ones of the raised ribs toward the peak elevation. A tubular-shaped sleeve of the central core has an end face. The first plane is oriented perpendicular to a central axis of the sleeve. Each of the concentric raised ribs is co-axially aligned with the central axis. At least one tab extends outwardly from the tubular-shaped sleeve proximate the end face, having an apex defining a first plane selectively positioned with respect to a second plane defined by the perimeter edge.

According to still further aspects, a removable wheel cover system for temporary use in protecting automotive vehicle wheels includes a polymeric wheel cover having a dome-shaped body having a circular perimeter edge and a central core. A sleeve wall of the central core has an end face defining a first plane positioned away from the body with respect to a second plane defined by the perimeter edge. At least one tab extends outwardly from the sleeve wall proximate to the end face. A wheel having a central hub is mounted to a tire such that the perimeter edge is retained in continuous contact with one of the tire or the wheel.

According to still further aspects, a removable wheel cover system for temporary use in protecting automotive vehicle wheels includes a polymeric wheel cover having a dome-shaped body having a tubular shaped central core. Multiple concentric raised ribs are created in the body between a reverse outer rib and the central core, each changing in diameter between successive ones of the raised ribs. A sleeve wall of the central core has an end face defining a plane which is recessed below a second plane defined by a contact surface of the reverse outer rib. Multiple engagement tabs extending outwardly from a sleeve wall of the central core are positioned proximate to the end face. A wheel has a wheel hub aperture. The tabs are engagingly received against a raised edge extending into the wheel hub aperture of the wheel thereby resisting removal of the wheel cover from the wheel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
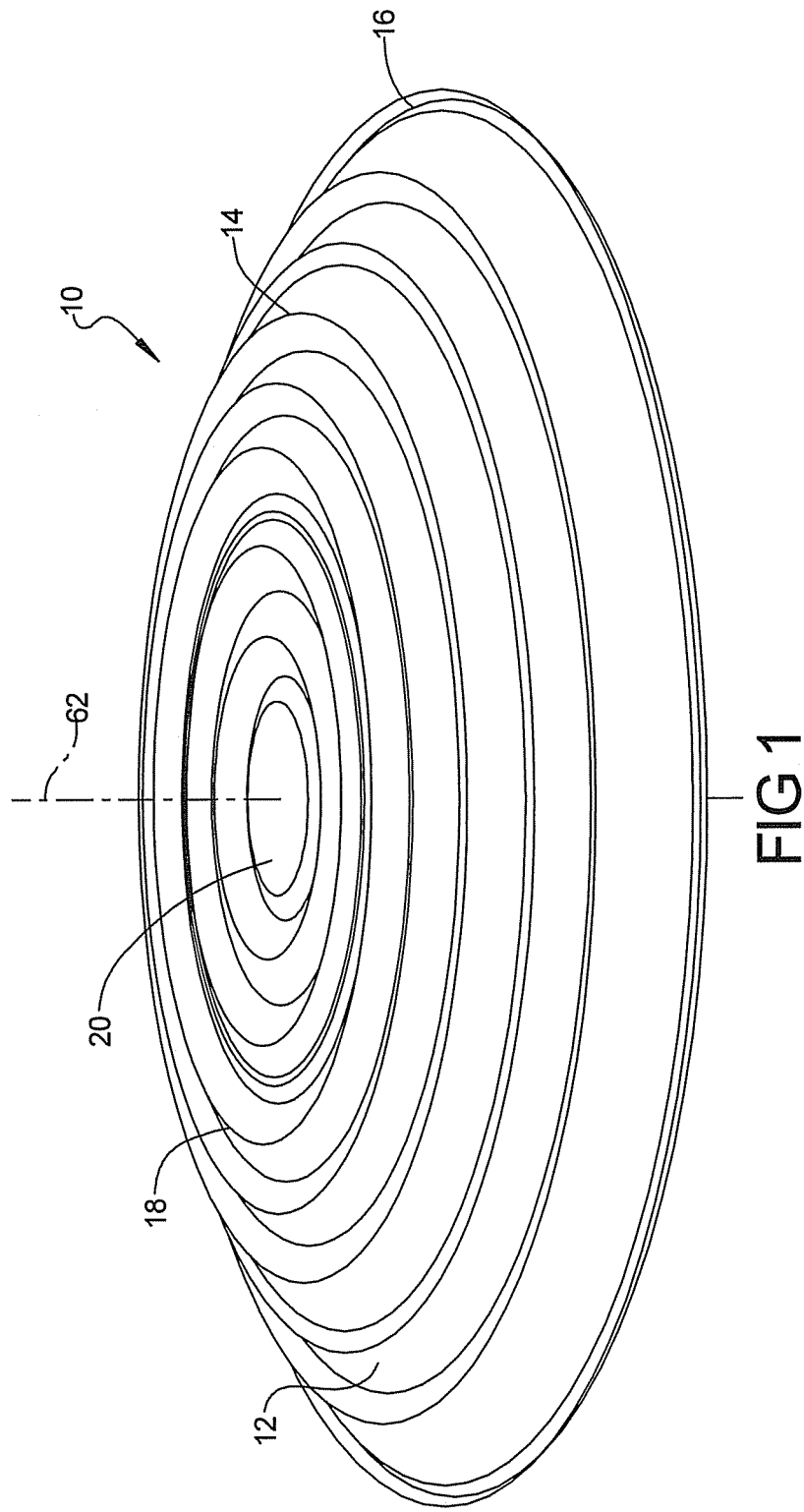
FIG. 1 is a front perspective view of a wheel cover of the present disclosure.

Referring to FIG. 1, a wheel cover 10 of the present disclosure is made from a polymeric material which can be clear or opaque. Wheel cover 10 includes a body 12 which is substantially circular when viewed in plan view having a plurality of substantially circular raised ribs 14 concentrically arranged with respect to each other, and spaced from each other such that each of the raised ribs 14 has a different rib diameter. A reverse outer rib 16 defines an outermost one of the raised ribs 14. Body 12 is dome shaped when viewed in elevation having a maximum height rib 18 positioned between a tubular shaped central core 20 and reverse outer rib 16. Each of the raised ribs 14 have a cross-sectional shape defining an inverse U or V-shape with an apex of the "U" or "V" directed upwardly, as viewed in FIG. 1. The body 12 is not limited to a circular shape and can also include other geometric shapes. The raised ribs 14 are also not limited to a circular shape, and can also be non-concentrically arranged.

Figure 2:
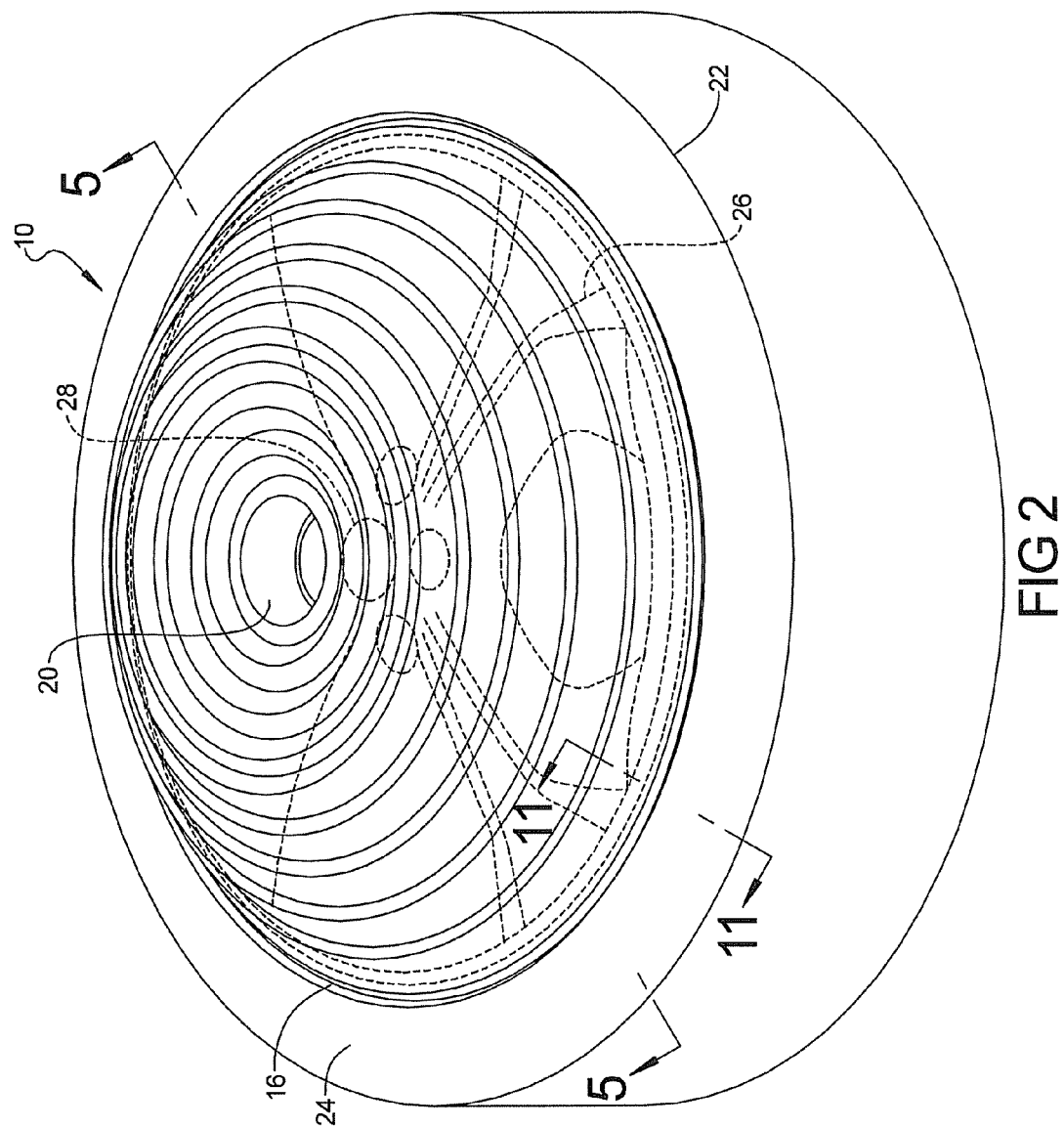
FIG. 2 is a front perspective view of the wheel cover of FIG. 1 in an aligned non-installed position with respect to a tire and wheel.

Referring to FIG. 2, wheel cover 10 is shown in an aligned, non-installed position with respect to a tire 22, having the reverse outer rib 16 in direct contact with a tire sidewall 24. At this time, only the reverse outer rib 16 is in contact with tire 22, having no other portion of wheel cover 10 in direct contact with tire 22 or a wheel 26 upon which tire 22 is mounted. In the aligned, non-installed position of wheel cover 10, the central core 20 is co-axially aligned with a wheel hub aperture 28 of wheel 26.

Figure 3:
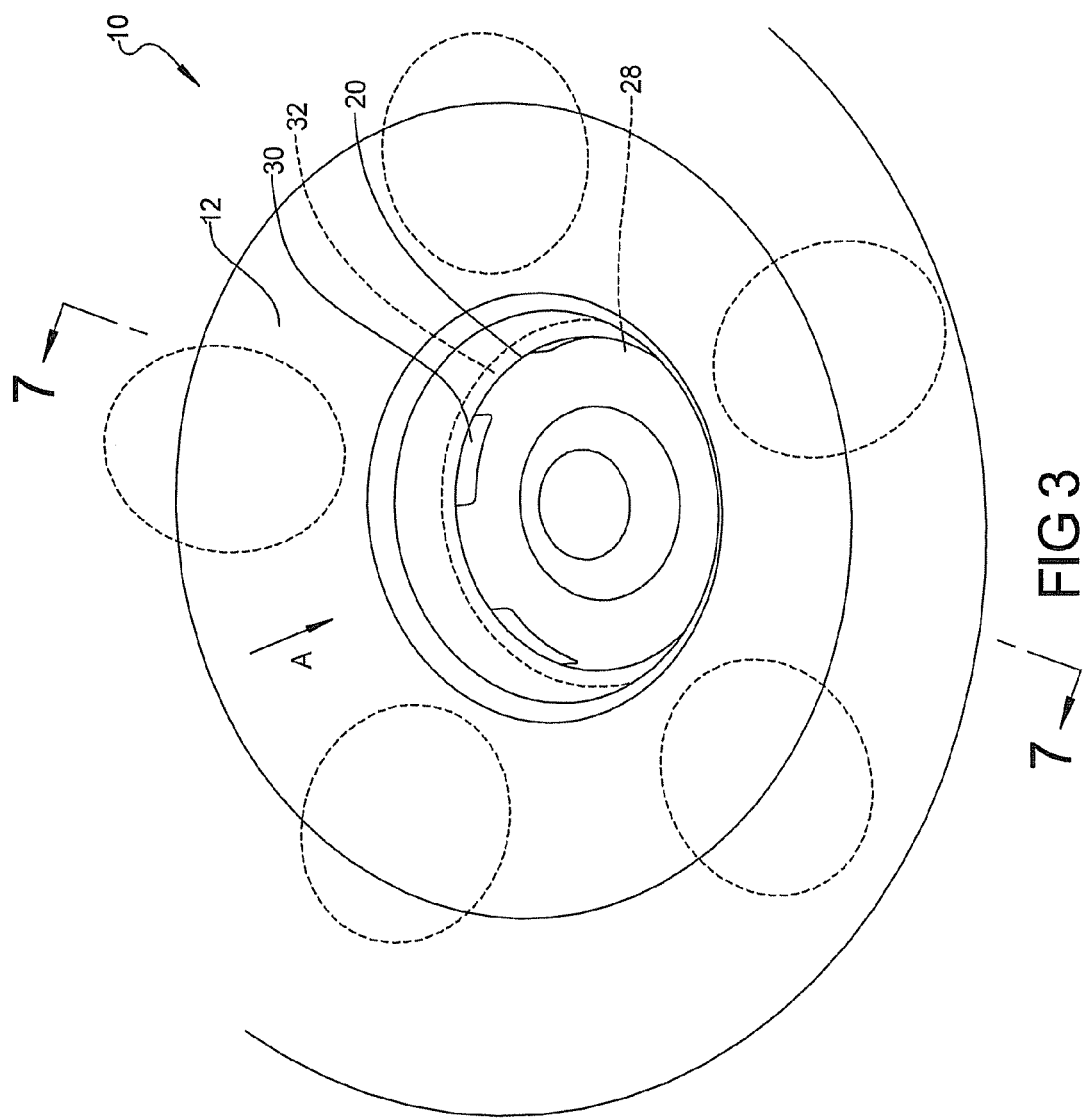
FIG. 3 is a top perspective view of the wheel cover, tire and wheel of FIG. 3 further showing a deflected installed position of the wheel cover.

Referring to FIG. 3, at least one and according to several embodiments multiple engagement or retention tabs 30 extend outwardly from and are integrally connected to the central core 20. When only one tab 30 is present, it can extend substantially entirely about a circumference of central core 20, or extend at least 180 degrees about the circumference of central core 20 to provide retention capability. A deflected, installed position of wheel cover 10 is reached by pressing central core 20 partially into wheel hub aperture 28 in an installation direction "A", thereby elastically deflecting body 12 in the installation direction "A". Central core 20 is pressed into wheel hub aperture 28 until each one of the tabs 30 both rotate and inwardly deflect as they pass an inwardly directed substantially circular raised edge 32 of wheel 26 which extends partially into wheel hub aperture 28. After they rotate and inwardly deflect, the tabs 30 elastically outwardly rebound to engage and frictionally couple central core 20 of wheel cover 10 to wheel 26.

Figure 4:
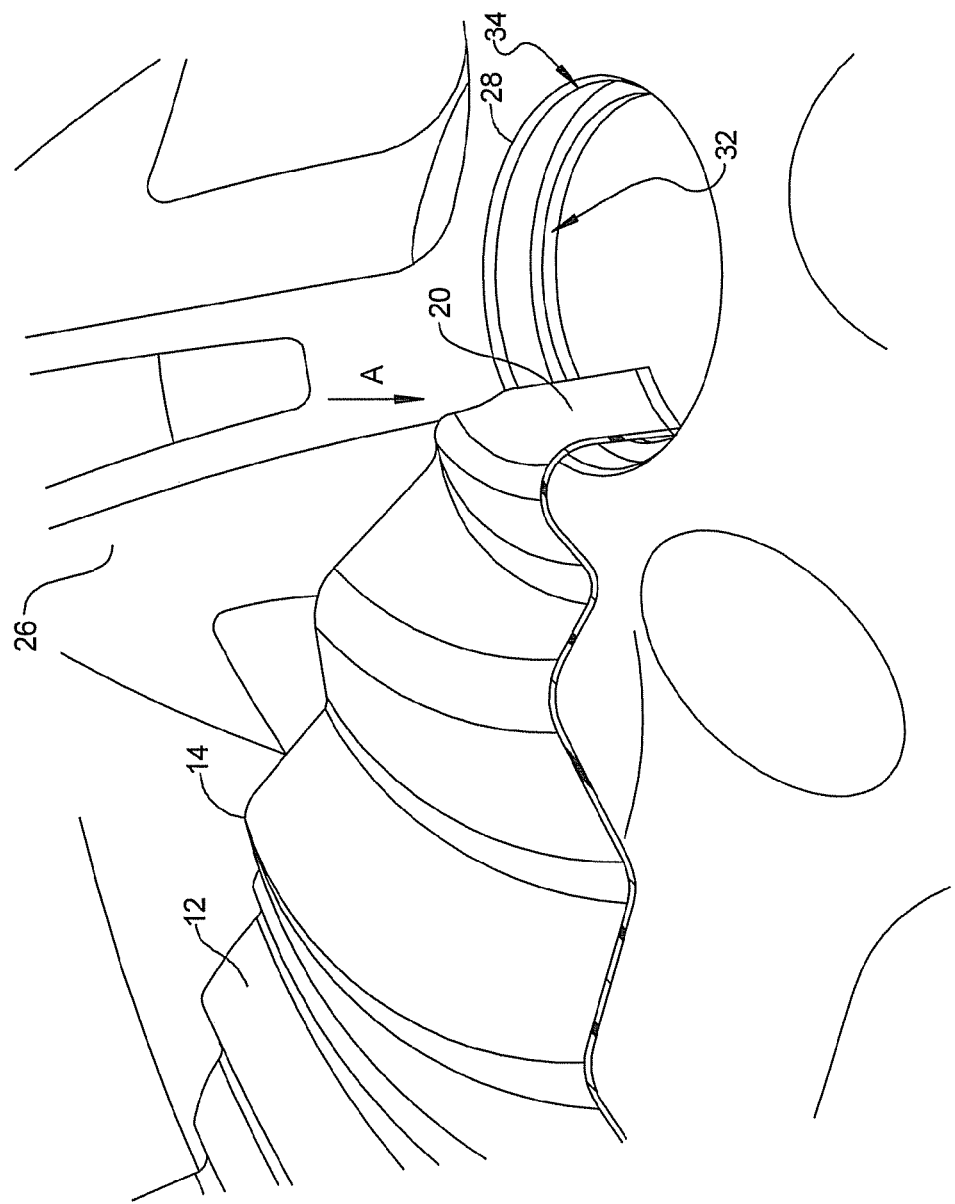
FIG. 4 is a partial cross sectional top perspective view showing a wheel cover portion in an installed position on the wheel hub.

Referring to FIG. 4, a portion of wheel cover 10 is shown to better depict the installation of central core 20 as it is inserted in the installation direction "A" into wheel hub aperture 28. Prior to reaching raised edge 32, a portion of central core 20 including each of the tabs 30 slidingly and frictionally contact an inner wall 34 defining wheel hub aperture 28. No contact occurs between wheel 26 and the remaining portions of body 12 including any of the raised ribs 14 during or following installation of central core 20.

Figure 5:
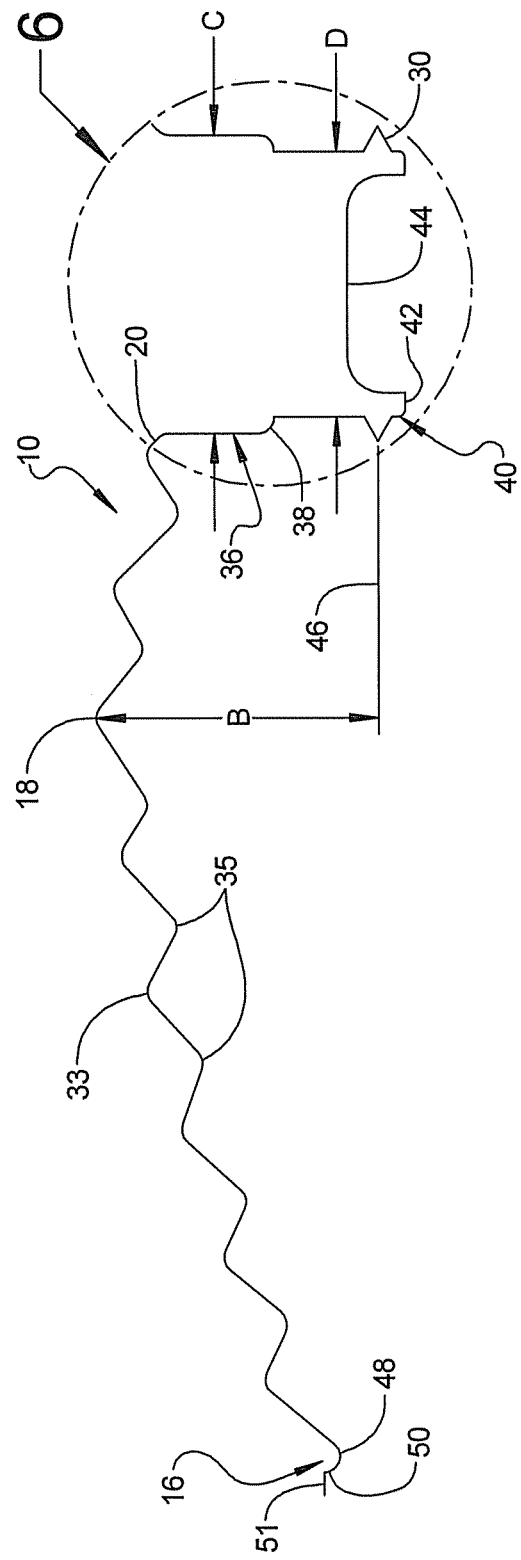
FIG. 5 is a cross sectional front elevational view taken at section 5 of FIG. 2.

Referring to FIG. 5 and again to FIG. 2, body 12 includes a peak 33 and at least one valley 35 defining each of the raised ribs 14. Maximum height rib 18 provides a body maximum height "B" defining a maximum height or elevation for a dome shape of body 12. Central core 20 includes a first sleeve wall 36 having a first sleeve diameter "C". A wall transition 38 extends between first sleeve wall 36 and a second sleeve wall 40. Second sleeve wall 40 has a second sleeve diameter "D" which is smaller than first sleeve diameter "C". A central core end 42 includes a concave, curved, conical or other geometrically shaped end wall 44. End wall 44 provides clearance for example to grease or other end caps connected to wheel 26. An apex of the one or more tabs 30 define(s) a first plane 46 from which body maximum height "B" of maximum height rib 18 is determined.

The reverse outer rib 16 includes a rib/tire contact surface 48 which defines a concave, "U" or "V" shape having an apex or end of its valley 35 directed downwardly or toward first plane 46. This is opposite to the orientation of the convex, inverted "U" or "V" shape defined by the plurality of raised ribs 14, including maximum height rib 18, each having their peak 33 directed upwardly or away from first plane 46 as viewed in FIG. 5. A rib raised lip 50 extends outwardly and upwardly (as viewed in FIG. 5) with respect to rib/tire contact face 48. Rib raised lip 50 is provided to prevent direct contact of a blunt or sharp end face of wheel cover 10 from contacting the tire sidewall 24 of tire 22. A flange 51 can extend diametrically outward from rib raised lip 50 to provide a flat surface from which to dimensionally control the perimeter edge of wheel cover 10. According to other embodiments, either one or both of the first and second sleeve walls 36, 40 can taper downwardly as viewed in FIG. 5 in lieu of having axially concentric tubular shaped walls.

Figure 6:
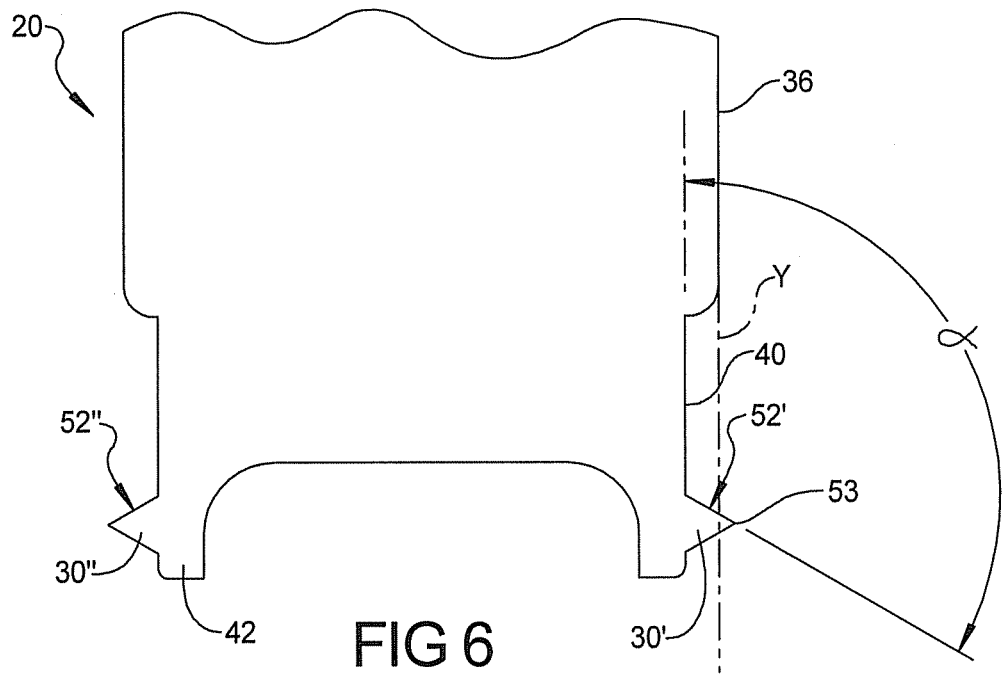
FIG. 6 is a front elevational view of area 6 of FIG. 5 rotated to show opposed tabs.

Referring to FIG. 6, the at least one or each of the plurality of tabs 30 are positioned proximate to central core end 42 and when multiple tabs 30 are present can each be located at equal distances from successive ones of the tabs 30 about the perimeter defined by second sleeve wall 40. The tab or tabs 30, herein represented by oppositely positioned and oppositely directed tabs 30', 30", are generally arrowhead or triangular shaped and include at least a tab contact face 52, herein shown as tab contact faces 52', 52". Each of the tab contact faces 52 is oriented at an angle alpha (α) with respect to second sleeve wall 40 that can be an acute angle, a right angle, or an obtuse angle. According to several embodiments, angle α can range between approximately 30 degrees to approximately 135 degrees or more. Angle α is therefore depicted as an obtuse angle as only one exemplary embodiment. The tab or tabs 30 can include one, two, three, or more tabs, and according to several embodiments include six tabs 30. The tabs 30 extend outwardly from and are integrally connected to the second sleeve wall 40 proximate to central core end 42. In the as-molded or pre-installed condition of central core 20, each of the engagement tabs 30 has a substantially V-shape with an outwardly directed apex 53 extending outwardly beyond a plane "Y" defined by the first sleeve wall 36.

Figure 7:
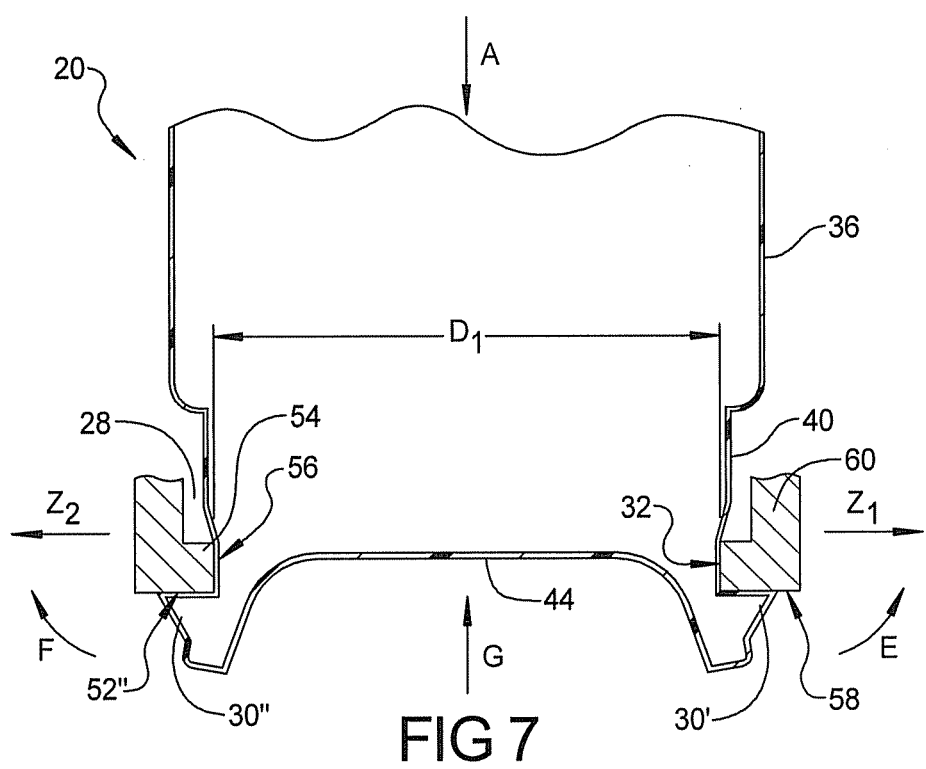
FIG. 7 is cross sectional front elevational view taken at section 7 of FIG. 3.

Referring to FIG. 7 and again to FIGS. 2 and 3, when central core 20 is moved in the installation direction "A" within wheel hub aperture 28, the tabs 30 (shown for example as tabs 30', 30" for clarity) deflect or rotate in exemplary rotation directions "E" or "F" respectively due to contact with raised edge 32 of a flange 54 extending inwardly and partially into the wheel hub aperture 28. As the tabs 30', 30" pass flange 54, the raised edge 32 contacts and inwardly elastically deflects a portion of second sleeve wall 40 defining a deflected portion or region 56. Deflected region 56 (and therefore flange 54) has a reduced second sleeve diameter "$D_1$", which is smaller than second sleeve diameter "D". This inward deflection of second sleeve wall 40 causes tabs 30', 30" to rotate oppositely with respect to the installation direction "A" in each of the rotation directions "E" and "F" until the tab contact faces 52', 52" directly contact and are oriented substantially parallel to a flange bottom face 58 of a wheel hub 60. This contact between tab contact faces 52', 52" and flange bottom face 58 thereafter resists removal of central core 20 and therefore of wheel cover 10 from wheel 26 in the reverse or removal direction "G". An outwardly directed biasing force (shown for example as biasing forces $Z_1$, $Z_2$) is also created by deflected region 56 of second sleeve wall 40 where it contacts raised edge 32, providing further frictional resistance which further resists removal and/or axial rotation of central core 20.

Figure 8:
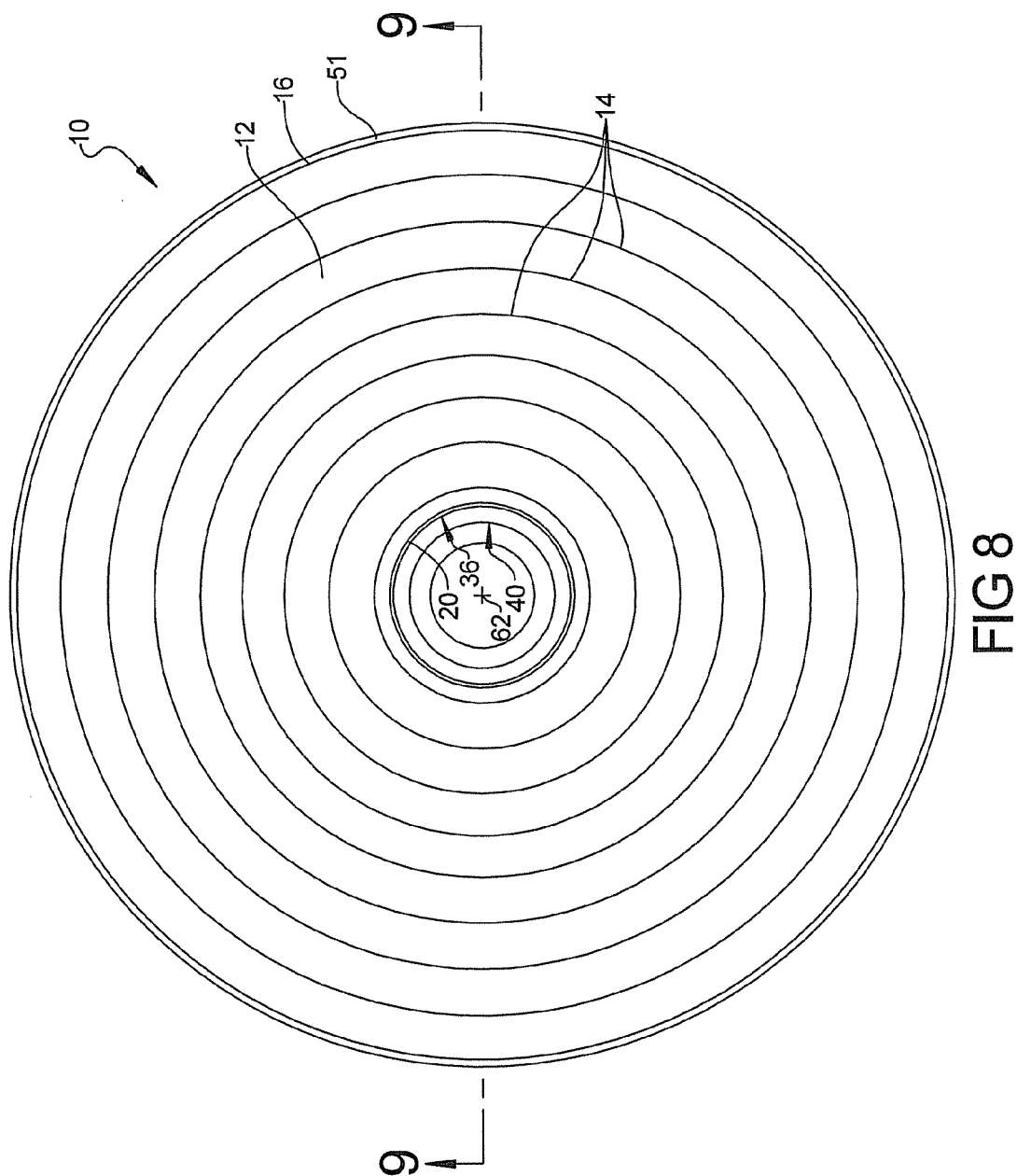
FIG. 8 is a top plan view of the wheel cover of FIG. 1.

Referring to FIG. 8, central core 20 of wheel cover 10 is configured having circular and substantially tubular shaped first and second sleeve walls 36, 40 co-axially aligned with respect to a wheel cover central axis 62. The raised ribs 14 and reverse outer rib 16 are also co-axially aligned with respect to central axis 62.

Referring to FIG. 9 and again to FIGS. 2 and 3, wheel cover 10 has a wheel cover diameter "H". Wheel cover 10 including wheel cover diameter "H" can be modified by either increasing or reducing a quantity of raised ribs 14, or by changing the geometry or a raised rib diameter "J" of the raised ribs 14 (only a single exemplary diameter "J" is shown for clarity). Wheel covers 10 can also be modified to create different embodiments by increasing or decreasing wheel cover diameter "H", for example by circumferentially cutting at one of the raised ribs 14 to create a geometry similar to reverse outer rib 16. The geometry of central core 20 can be maintained or modified between different embodiments to permit wheel covers 10 to be installed on similar wheel hub designs of different wheels 26 or different sized wheel/tire combinations.

Figure 9:
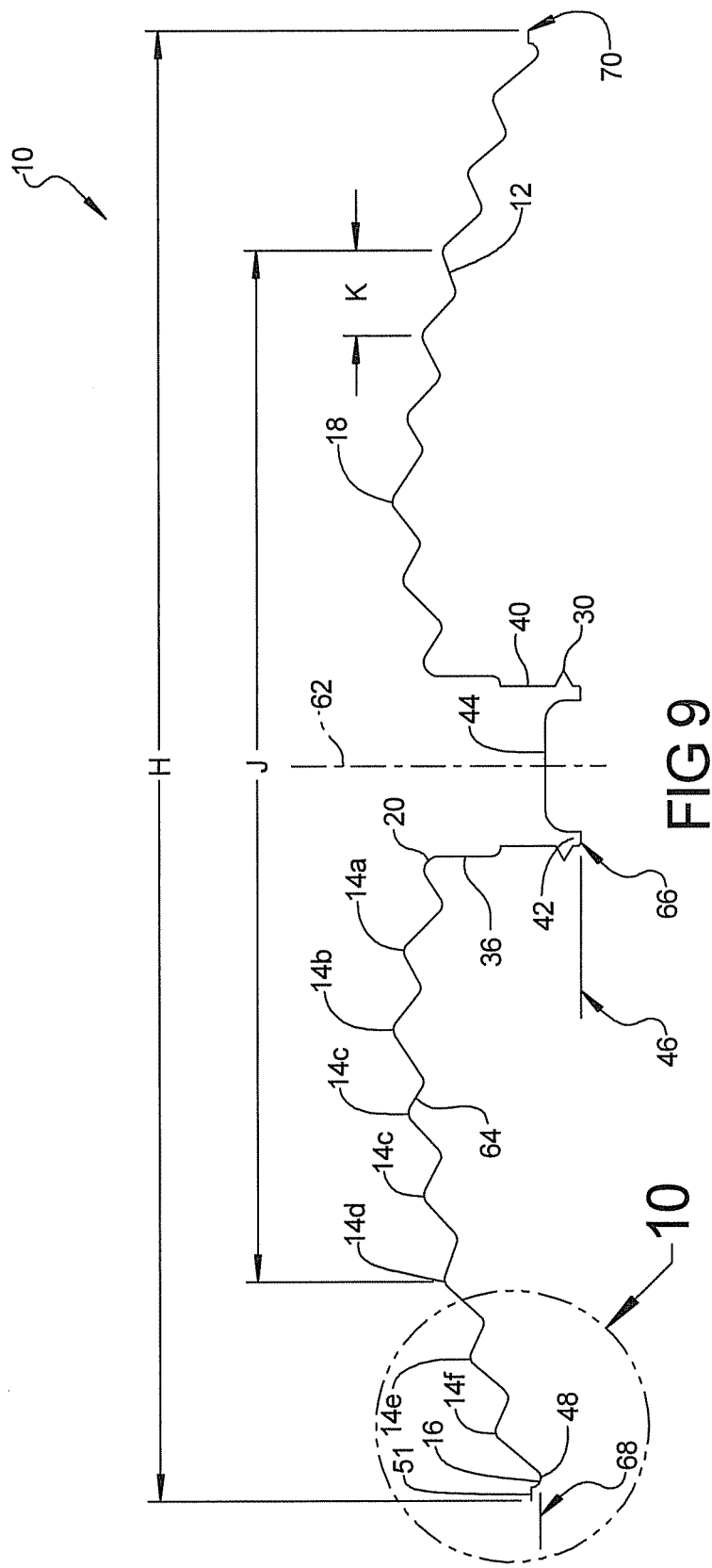
FIG. 9 is a cross sectional front elevational view taken at section 9 of FIG. 8.

With continued reference to FIG. 9, each of the raised ribs 14 is concentrically positioned with respect to central axis 62. A quantity of and a spacing between sequential ones of raised ribs 14 can vary. According to several embodiments, wheel cover 10 includes seven raised ribs 14 including raised ribs 14a, 14b, 14c, 14d, 14e, 14f and reverse outer rib 16. According to several aspects, maximum height rib 18 defines the maximum height of body 12 with respect to first plane 46. Each of the remaining raised ribs 14 concentrically steps downward in elevation in each successive raised rib position with respect to maximum height rib 18. According to additional embodiments, one or more of raised ribs 14 can have a rounded, a rectangular, or other geometric cross sectional shape in lieu of a V-shape. Although each of the individual raised ribs 14 can have an equal spacing dimension "K" between any proximate ones of the raised ribs 14, spacing dimension "K" between any or all of the raised ribs can also be varied within the scope of this disclosure. Wheel cover diameter "H" is measured with respect to flange 51 of reverse outer rib 16. Because wheel cover 10 can be provided in one or more aspects each having a different wheel cover diameter "H", different wheel cover 10 embodiments can be used on a range of tire and wheel sizes. For example, a first embodiment of wheel cover 10 can be sized to be mounted on wheels ranging in diameter from 17 to 18 inches, while a second embodiment can be sized to be mounted on wheels ranging in diameter from 19 to 20 inches.

When wheel cover diameter "H" is defined, a second plane 68 is defined at rib/tire contact surface 48 which can be co-planar with, below or elevated with respect to first plane 46. A perimeter edge 70 is created either during a molding process creating wheel cover 10, or by cutting wheel cover 10 to achieve the desired wheel cover diameter "H". As previously noted, maximum height rib 18 defines the greatest height of the body 12 including raised ribs 14 measured with respect to end face 66.

According to several embodiments, a removable wheel cover system for temporary use in protecting automotive vehicle wheels 26 includes a polymeric wheel cover 10 having a dome-shaped body 12 including a tubular shaped central core 20. Multiple concentric raised ribs 14 are created in the body 12 between a reverse outer rib 16 and the central core 20, each changing in diameter between successive ones of the raised ribs 14. The tubular-shaped second sleeve wall 40 of the central core 20 has an end face 66 having first plane 46 positioned co-planar therewith. First plane 46 is "selectively positioned" (for example by selecting a specific one of multiple die components defining central core 20) with respect to a second plane 68 defined by the rib/tire contact surface 48 of reverse outer rib 16 that is oriented parallel with first plane 46. One or multiple engagement members or tabs 30 are created integral to and extend outwardly from the tubular-shaped portion or sleeve wall 40 proximate end face 66.

A wheel 26 has a central wheel hub aperture 28. The tabs 30 slide past a raised edge 32 extending into wheel hub aperture 28 and then engage a flange bottom face 58 of a flange 54 that also includes raised edge 32. Elastic deflection of the one or more tabs 30 creates a biasing force in deflected region 56 acting to hold deflected region 56 in frictional contact with flange 54 to resist removal or axial rotation of the wheel cover 10.

Referring again to both FIGS. 2 and 9, according to further aspects, diameter "H" of wheel cover 10 can be further selected such that direct contact occurs between contact surface 48 and an outer perimeter area of wheel 26 in lieu of to tire sidewall 24. For these aspects, except for the direct contact occurring between both the contact surface 48 and central core 20 with wheel 26, no other direct contact to wheel 26 occurs between the remaining portions of body 12 including any of the raised ribs 14 during or following installation of central core 20. According to these aspects of wheel cover 10, no direct contact occurs between wheel cover 10 and tire 22.

Figure 10:
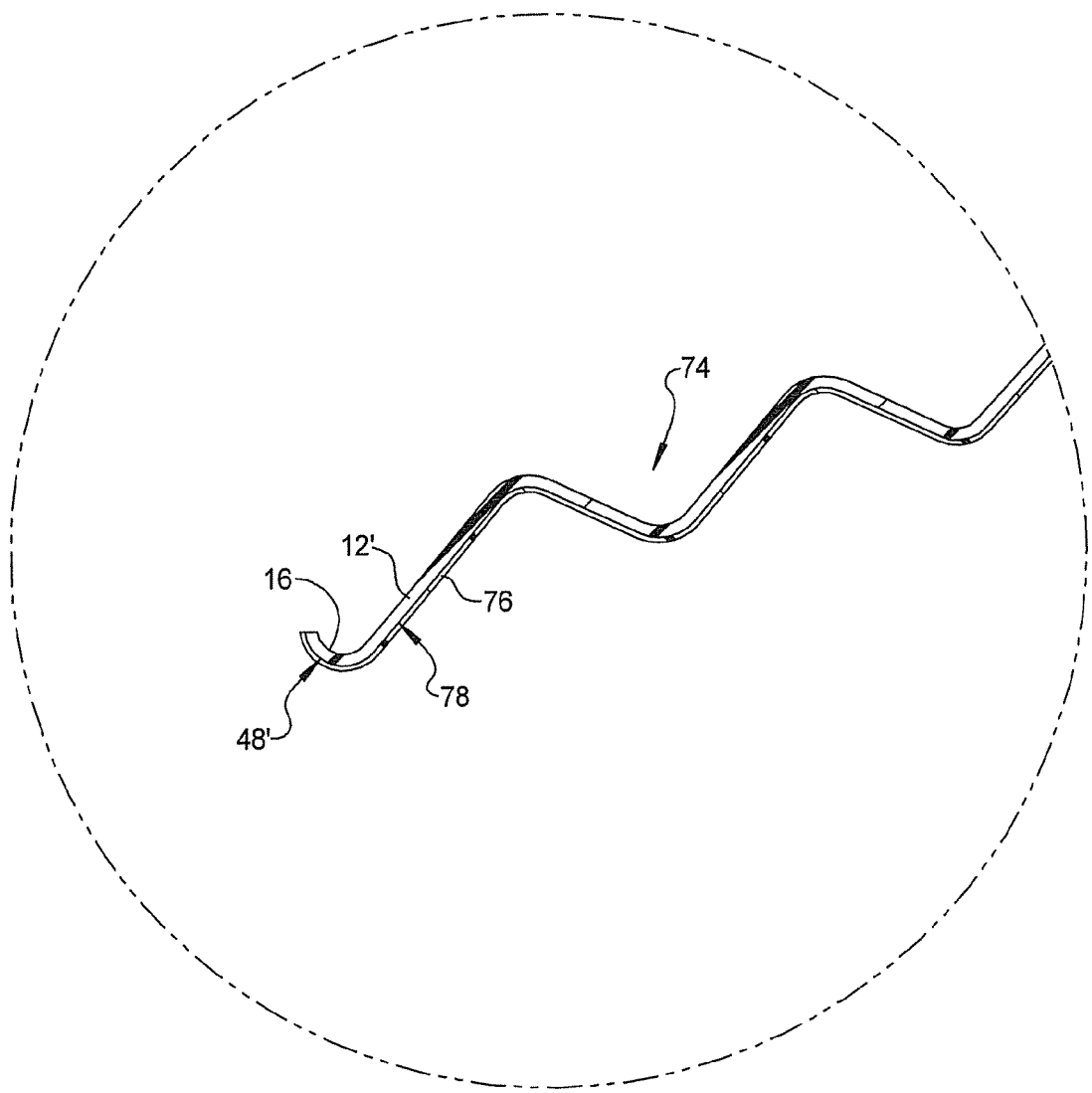
FIG. 10 is a cross sectional front elevational view taken at area 10 of FIG. 9 of a further aspect of the disclosure.

Referring to FIG. 10 and again to FIGS. 1, 2 and 9, according to further aspects a wheel cover 74 is modified from wheel cover 10, therefore only the differences from wheel cover 10 will be further discussed. Wheel cover 74 further includes a polymeric material layer 76 that is of a polymeric material softer than the polymeric material of the body 12'. The layer 76 is fixedly connected to the body 12' on a body side 78 facing the vehicle wheel 26 mounted on tire 22 when the wheel cover 74 is in an installed condition such as shown in FIG. 2. The layer 76 acts as an anti-mar coating to mitigate against the wheel cover 74 marring a surface of either the vehicle wheel 26 or the tire 22. Layer 76 can be applied during an extrusion or forming process at the same time as formation of sheet material used to subsequently make body 12', and is therefore chemically and/or physically fixedly connected to the material of body 12'. Layer 76 extends outwardly to contact and cover the rib/tire contact surface 48' of reverse outer rib 16'. According to several aspects, a polymeric material used for the layer 76, as well as the material of body 12' are either both transparent or both translucent to permit the wheel 26 to be viewed through the wheel cover 74. According to several aspects, a material of layer 76 can be an olefin material, or similar resilient material.

Figure 11:
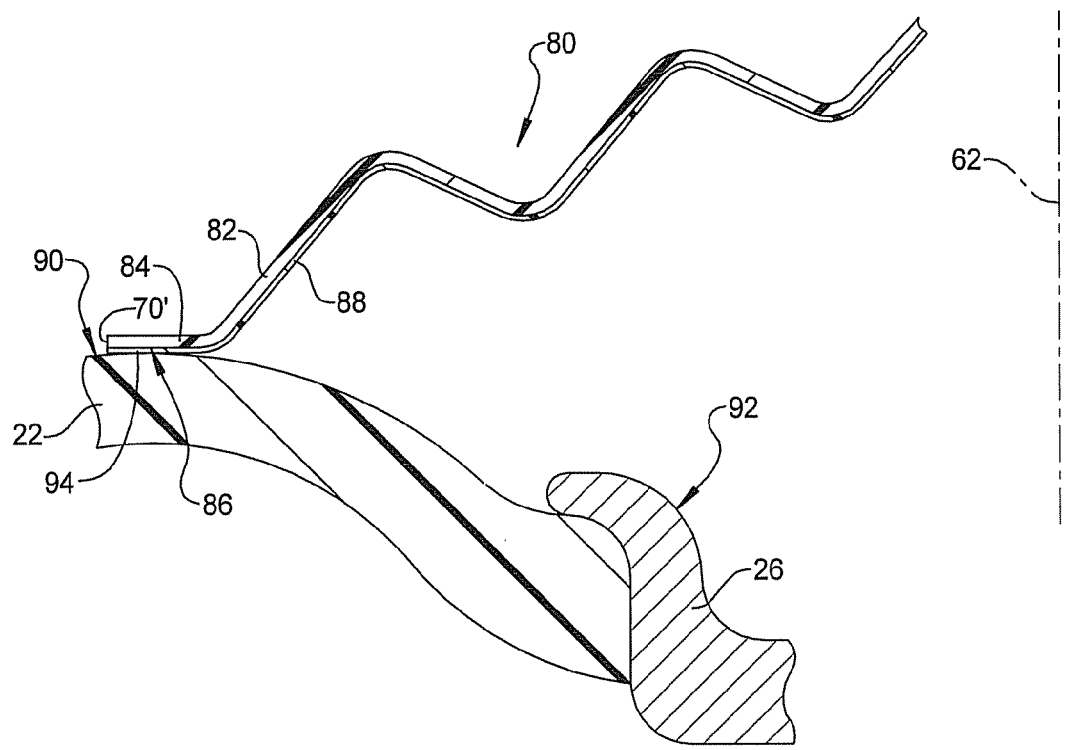
FIG. 11 is a cross sectional front elevational view taken at section 11 of FIG. 2, showing a further aspect of the disclosure.
Figure 12:
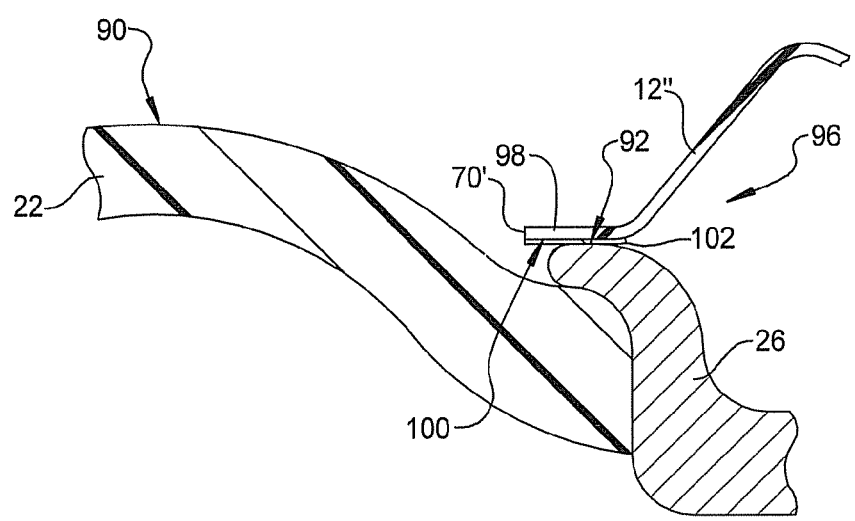
FIG. 12 is a cross sectional front elevational view similar to FIG. 11, showing a further aspect of the disclosure.

Referring to FIG. 11 and again to FIGS. 1, 2, 9 and 10, according to additional aspects a wheel cover 80 is modified from wheel covers 10 and 74, therefore only the differences from wheel covers 10 and 74 will be further discussed. Wheel cover 80 includes a body 82 having a flat rib 84 in lieu of reverse outer rib 16, 16' in the area of perimeter edge 70'. Flat rib 84 is oriented approximately perpendicular to wheel cover axis 62, which can include orientation at an angle of up to approximately plus or minus 15 degrees with respect to true perpendicularity with wheel cover axis 62. This orientation of flat rib 84 allows a side 86 of flat rib 84 facing wheel 26 and/or tire 22 to contact either an outer surface 90 of tire 22 (shown) or an outer surface 92 of wheel 26 (when a diameter of wheel cover 80 is reduced accordingly and as shown in FIG. 12). When wheel cover 80 also includes a layer 88 similar to layer 76, a contact portion 94 of layer 88 directly contacts either the outer surface 90 or tire 22 or outer surface 92 of wheel 26.

Referring to FIG. 12 and again to FIGS. 1, 2, 9, 10 and 11, according to additional aspects a wheel cover 96 is modified from wheel covers 10, 74 and 80, therefore only the differences from wheel covers 10, 74 and 80 will be further discussed. Wheel cover 96 includes a flat rib 98 similar to flat rib 84 having a side 100 of flat rib 98 facing wheel 26 and/or tire 22 to contact either the outer surface 90 of tire 22 (similar to the configuration shown in FIG. 11) or the outer surface 92 of wheel 26 (shown). In lieu of layers 76 or 88 covering the entire face of the wheel cover, wheel cover 96 includes a layer 102 of a resilient material that is more pliable than the polymeric material of the body 12''. The layer 102 is fixedly connected only at side 100 of flat rib 98. Layer 102 is fixedly connected such as by chemical or temperature bonding, using an adhesive, or by an adhesive property of the material selected for layer 102, at least proximate the perimeter edge 70'' on the perimeter side 100. Layer 102 therefore faces and directly contacts the wheel 26 or tire 22 when the wheel 26 is mounted on tire 22 thereby defining the wheel cover installed condition. The layer 102 of resilient material, similar to layers 76, 88 acts as an anti-mar coating to mitigate against the wheel cover 96 marring surface 90 or 92 of either the tire 22 wheel or the wheel 26.

According to several aspects, layer 102 can include a coating of a fiber material such as felt pads, flocking or the like, a thermo-plastic such as polyethylene, polypropylene, HIPS or the like, or a urethane material, any of which are fixed to the flat rib 98. Layer 102 can also be provided as a gasket made for example of a rubber or synthetic rubber material. Layer 102 can further be provided as a low friction material such as polytetraflouroethylene, silicone, or the like which can be adhesively, chemically or otherwise fixed to flat rib 98.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A removable wheel cover for temporary use in covering automotive vehicle wheels, comprising:
    a body made of a first material, the first material being a polymeric material, the body including a central core, a perimeter edge, and multiple concentric raised ribs defining multiple body peaks and valleys positioned between the central core and the perimeter edge, the body having a body side that faces a vehicle wheel when the removable wheel cover is in an installed condition;
    an anti-mar layer made of a second material fixedly connected to the body on the body side that mitigates against the removable wheel cover marring the vehicle wheel or a tire when the removable wheel cover is in the installed condition, wherein the second material of the anti-mar layer is softer than the first material of the body, and
    an upwardly raised reverse outer rib positioned proximate to the perimeter edge and outward of the raised ribs, the reverse outer rib having one of the valleys and a raised lip terminating at the perimeter edge, wherein the reverse outer rib contacts the wheel or the tire when the removable wheel cover is in the installed condition, and wherein the raised lip spaces the perimeter edge from the wheel or tire when the removable wheel cover is in the installed condition.

2. The removable wheel cover of claim 1, wherein the central core includes an elastically deflectable sleeve wall.

3. The removable wheel cover of claim 2, further including at least one tab extending outwardly from and integrally connected to the sleeve wall of the central core.

4. The removable wheel cover of claim 3, wherein the at least one tab defines a substantially V-shape having an outwardly directed apex and a tab contact face oriented at an angle with respect to the sleeve wall, the apex defining a plane, a height of proximate ones of the body peaks measured from the plane being different from each other.

5. The removable wheel cover of claim 3, wherein the at least one tab includes multiple tabs, a spacing between any proximate ones of the multiple tabs being constant.

6. The removable wheel cover of claim 5, wherein when the central core is received in a recessed hub of a wheel mounted to a tire, the body when axially elastically deflected to engage the tabs with the recessed hub thereby creates a biasing force retaining the perimeter edge in contact with either the wheel or the tire.

7. The removable wheel cover of claim 1, wherein the raised ribs are located between the reverse outer rib and the central core, each having a raised rib diameter changing between successive ones of the raised ribs and each including one of the body peaks oriented oppositely with respect to the valley of the reverse outer rib.

8. The removable wheel cover of claim 1, wherein the raised ribs each define a substantially inverted V or U shape.

9. The removable wheel cover of claim 8, wherein the reverse outer rib defines a V or U shape oppositely directed with respect to the inverted V or U shape of the raised ribs.

10. The removable wheel cover of claim 1, wherein a first one of the raised ribs positioned closest to the central core is at a lower elevation with respect to a maximum height rib positioned outward of the first one of the raised ribs.

11. The removable wheel cover of claim 10, wherein individual ones of the raised ribs positioned either inward or outward of the maximum height rib have a reduced height measured with respect to a central core end compared to a height of the maximum height rib, thereby defining a body dome shape.

12. The removable wheel cover of claim 10, wherein successive ones of the raised ribs outward of the maximum height rib are lower in height than preceding ones of the raised ribs.

13. The removable wheel cover of claim 1, wherein the central core further includes:
    first and second sleeve walls; and
    a wall transition positioned between the first and second sleeve walls, the wall transition permitting a diameter of the first sleeve wall to be greater than a diameter of the second sleeve wall.

14. The removable wheel cover of claim 1, wherein the raised ribs are concentrically positioned with respect to a central axis of the wheel cover.

15. The removable wheel cover of claim 1, further including a flat outer rib positioned proximate to the perimeter edge and outward of the raised ribs, the flat rib oriented approximately perpendicular to a central axis of the wheel cover.

16. The removable wheel cover of claim 1, wherein the second material of the anti-mar layer is a polymeric material that is different than the polymeric material comprising the first material of the body.

17. The removable wheel cover of claim 16, wherein both the first material of the body and the second material of the anti-mar layer are substantially translucent.

18. The removable wheel cover of claim 1, wherein the second material of the anti-mar layer is a resilient material.

19. A removable wheel cover for temporary use in protecting automobile vehicle wheels, comprising:
    a dome-shaped body of a polymeric material, the body having a perimeter edge and a central core, the body increasing in elevation from the perimeter edge to a maximum elevation located between the perimeter edge and the central core, the central core positioned below the maximum elevation;
    multiple raised ribs created in the body between the perimeter edge and the maximum elevation, the raised ribs decreasing in diameter between successive ones of the raised ribs toward the maximum elevation;
    an elastically deflectable sleeve wall of the central core extending between the dome-shaped body and the multiple raised ribs; and
    at least one tab extending outwardly from and integrally connected to the sleeve wall of the central core, the at least one tab having an outwardly directed apex and a tab contact face extending from the sleeve wall that is oriented at an obtuse angle with respect to the sleeve wall in a non-installed position, wherein the sleeve wall is inwardly elastically deflectable proximate to the at least one tab such that the tab contact face is rotated to an orientation substantially perpendicular to the sleeve wall in an installed position.

20. The removable wheel cover of claim 19, wherein the apex of the at least one tab defines a first plane selectively positioned with respect to a second plane defined at the perimeter edge.

21. The removable wheel cover of claim 19, wherein the sleeve wall of the central core includes first and second sleeve wall portions, the first sleeve wall portion having a first diameter and the second sleeve wall portion having a second diameter smaller than the first diameter.

22. The removable wheel cover of claim 19, wherein the at least one tab includes multiple tabs extending outwardly from and integrally connected to the second sleeve wall portion, each of the tabs having a substantially V-shape with an outwardly directed apex extending outwardly beyond a plane defined by the first sleeve wall portion.

23. The removable wheel cover of claim 19, wherein the polymeric material body comprises a clear or translucent material permitting visibility of the automobile vehicle wheel when the body is in an installed position having the central core frictionally engaged with the automobile vehicle wheel.

24. The removable wheel cover of claim 19, further including a layer of resilient material softer than the polymeric material of the body, the layer of resilient material fixedly connected at least to the perimeter on a perimeter side facing a vehicle wheel with the vehicle wheel mounted on a tire when the wheel cover is in an installed condition, the layer of resilient material acting as an anti-mar coating to mitigate against the wheel cover marring a surface of either the vehicle wheel or the tire.

25. A removable wheel cover for temporary use in protecting automotive vehicle wheels, comprising:
a dome-shaped body made of a first layer of polymeric material, the body having:
a circular perimeter edge, the body increasing in elevation from the perimeter edge inwardly to a peak elevation;
a perimeter side adjacent the circular perimeter edge, the perimeter side facing a vehicle wheel with the vehicle wheel mounted on a tire when the removable wheel cover is in an installed condition;
a central core recessed with respect to the peak elevation;
multiple concentric raised ribs created in the body between the perimeter edge and the peak elevation, each decreasing in diameter between successive ones of the raised ribs toward the peak elevation; and
a tubular-shaped sleeve of the central core having multiple tabs extending outwardly from the tubular-shaped sleeve proximate the end face, each of the tabs having a pair of faces that extend from the central core and slope towards each other to form an outwardly directed apex such that each of the tabs is substantially V-shaped, the outwardly directed apex defining a first plane selectively positioned with respect to a second plane defined by the perimeter edge, the first plane oriented perpendicular to a central axis of the body; and
wherein the body has a second layer of resilient material fixedly connected to at least the perimeter side of the body, the second layer of resilient material acting as an anti-mar coating to mitigate against the removable wheel cover from marring a surface of either the vehicle wheel or the tire when the removable wheel cover is in the installed condition, wherein the second layer of resilient material is softer than the first layer of polymeric material.

26. The removable wheel cover of claim 25, wherein the raised ribs are co-axially aligned with the central axis.

27. The removable wheel cover of claim 25, further including:
an end face of the tubular-shaped sleeve of the central core; and
a concave-shaped wall integrally connected to and recessed with respect to the end face.

28. The removable wheel cover of claim 25, wherein when the central core is received in a recessed hub of a wheel mounted to a tire, the body when axially elastically deflected to engage the tabs with the recessed hub thereby creates a biasing force retaining the perimeter edge in continuous contact with the tire.

29. The removable wheel cover of claim 25, wherein when the central core is received in a recessed hub of a wheel mounted to a tire, the body when axially elastically deflected to engage the tabs with the recessed hub thereby creates a biasing force retaining the perimeter edge in continuous contact with the wheel, and having no direct contact with the tire.

30. A removable wheel cover system for temporary use in protecting automotive vehicle wheels, comprising:
a polymeric wheel cover, including:
a dome-shaped body having a circular perimeter edge and a central core;
multiple tabs extending outwardly from the central core each having an outwardly directed apex, the apex of each of the multiple tabs together defining a first plane selectively positioned with respect to a second plane defined by the perimeter edge; and
a sleeve wall of the central core extending between the dome-shaped body and the multiple tabs;
a wheel having a central hub, the wheel mounted to a tire; and
an elastically deflected condition of the body being created when the body is elastically deflected toward the wheel to engage the central core with the central hub and the perimeter edge is positioned in continuous contact with only one of the tire or the wheel;
wherein the multiple tabs of the polymeric wheel cover are integrally connected to the sleeve wall, each of the multiple tabs having a substantially V-shape with an outwardly directed apex and a tab contact face extending from the sleeve wall to the outwardly directed apex, the tab contact face being oriented at an obtuse angle with respect to the sleeve wall in a non-installed position; and
wherein the sleeve wall is inwardly elastically deflectable proximate to the multiple tabs during insertion of the central core into the central hub of the wheel such that the tab contact face of each of the tabs is rotated toward a perpendicular angle with respect to the sleeve wall in an installed position to resist removal of the wheel cover.

31. The removable wheel cover system of claim 30, wherein the central core has a central core end that extends from the multiple tabs in a direction moving away from the dome-shaped body such that the multiple tabs are disposed between the sleeve wall and the central core end.

32. The removable wheel cover system of claim 31, wherein each of the tabs has an opposing tab face that extends between the outwardly directed apex of the tab and the central core end.

33. The removable wheel cover system of claim 30, wherein in the deflected condition of the body the sleeve wall is inwardly elastically deflected creating a biasing force retaining the sleeve wall in contact with the central hub.

34. The removable wheel cover system of claim 30, further including multiple concentric raised ribs created in the body between the perimeter edge and the central core, each decreasing in diameter between successive ones of the raised ribs between the perimeter edge and the central core.

35. The removable wheel cover of claim 30, further including a layer of resilient material softer than the polymeric material of the body, the layer of resilient material fixedly connected at least to the perimeter on a perimeter side facing the wheel with the wheel when the wheel cover is in an installed condition, the layer of resilient material acting as an anti-mar coating to mitigate against the wheel cover marring a surface of either the wheel or the tire.

36. A removable wheel cover system for temporary use in protecting automotive vehicle wheels, comprising:
   a wheel cover of a polymeric material, the wheel cover having a dome-shaped body including a tubular shaped central core and a perimeter edge;
   multiple concentric raised ribs created in the body between a reverse outer rib and the central core, each changing in diameter between successive ones of the raised ribs;
   multiple tabs extending outwardly from a sleeve wall of the central core positioned proximate to the end face, each of the tabs including an apex defining a plane which is recessed below a second plane defined by a contact surface of the reverse outer rib;
   a sleeve wall of the central core extending between the dome-shaped body and the multiple tabs;
   a wheel having a wheel hub aperture, the tabs releasably engagingly contacting an edge of the wheel hub aperture when the body is elastically deflected toward the wheel to insert the tabs into the wheel hub aperture thereby resisting removal of the wheel cover from the wheel thereby defining a wheel cover installed condition; and
   a tab contact face of each of the multiple tabs being elastically movable when the multiple tabs are received in the wheel hub aperture, the tab contact face extending from the sleeve wall and being elastically movable from a first orientation where the tab contact face is disposed at an obtuse angle relative to the sleeve wall to a second orientation where the tab contact face is rotated towards a perpendicular angle relative to the sleeve wall.

37. A removable wheel cover for temporary use in covering automotive vehicle wheels, comprising:
   a body made of a first material, the first material being a polymeric material, the body including a central core, a perimeter edge, and multiple concentric raised ribs defining multiple body peaks and valleys positioned between the central core and the perimeter edge, the body having a body side that faces a vehicle wheel when the removable wheel cover is in an installed condition; and
   an anti-mar layer made of a second material fixedly connected to the body on the body side that mitigates against the removable wheel cover marring the vehicle wheel or a tire when the removable wheel cover is in the installed condition, wherein the second material of the anti-mar layer is softer than the first material of the body,
   wherein the anti-mar layer extends continuously along the body proximate to the perimeter edge such that the anti-mar layer forms a continuous seal between the body and at least one of the vehicle wheel and the tire.

* * * * *